United States Patent [19]

Czech

[11] Patent Number: 4,655,564

[45] Date of Patent: Apr. 7, 1987

[54] SPECTACLE FRAME AND PARTS THEREOF

[75] Inventor: Guenther Czech, Filderstadt, Fed. Rep. of Germany

[73] Assignee: Simro A.G., Chur, Switzerland

[21] Appl. No.: 667,966

[22] Filed: Nov. 5, 1984

[30] Foreign Application Priority Data

Aug. 7, 1984 [DE] Fed. Rep. of Germany ....... 3429074

[51] Int. Cl.[4] .......................... G02C 5/14; G02C 5/02

[52] U.S. Cl. ...................................... 351/41; 351/111; 351/124

[58] Field of Search ................... 351/41, 83, 111, 124, 351/154

[56] References Cited

FOREIGN PATENT DOCUMENTS 2547631 10/1975 Fed. Rep. of Germany ........ 351/41
5162739 5/1978 Japan .................................... 351/41
0211118 12/1982 Japan .................................... 351/41

OTHER PUBLICATIONS

Modern Plastics, vol. 25, Jul. 1948, No. 11.

*Primary Examiner*—Rodney B. Bovernick

[57] ABSTRACT

The present invention relates to plastic eyewear, i.e. spectacle frames and parts thereof in which the plastic is selected from the group consisting of polyetherimide and polyethersulfone.

12 Claims, No Drawings

SPECTACLE FRAME AND PARTS THEREOF

This invention relates to spectacle frames and parts thereof, in particular temple, flange and bridge made of plastic.

The use of thermoplastic artificial materials for producing spectacle frames and parts thereof is known. Thus it is known how to manufacture spectacle frames and their components from cellulose acetate and cellulose butyrate, say, through injection molding. Such spectacle frames made of cellulose acetate and cellulose butyrate, however, are susceptible to being easily deformed.

In recent times the attempt has been made to manufacture spectacle frames and their component parts from other thermoplastic artificial materials. For this purpose special polyamides are used which can be easily processed by jet molding. In order to lend these known polyamides sufficient rigidity and flexibility the stressed components, especially the temple, will contain metal inserts.

In addition, epoxide compounds are described in German Published Patent Application No. 26 11 019 for manufacturing spectacle frames and their component parts which can be hardened in the mold. Spectacle frames made of eposide resins distinguish themselves by their relatively good bending strength and stability of shape.

It is furthermore known how to manufacture spectacle frames out of metals. Usually for their manufacture special alloys are used, say, a chromiumnickel alloy that excels in having a high degree of firmness together with a good elastic potential. Spectacle frames made of metals can thus undergo heavy stress.

The task on which this invention is based is to make available spectacle frames and spectacle frame components which, in addition to high properties of rigidity, have a high elastic resilience potential comparable to that of resilient metals and which can be manufactured in a simple manner by injection molding.

The polyetherimides or polyethersulfones used as plastics are distinguished by an excellent combination of properties. Polyetherimide or polyethersulfone, in addition to a high rigidity, has excellent thermal mold stability of shape and a low specific gravity, as well as a high elastic resilience potential similar to that of spectacle frames made of metals. For this reason the spectacle frames do not become permanently deformed after high mechanical stress. The spectacle frames and its components are especially light and allow for much comfort in wearing. As thermoplastics polyetherimide or polyethersulfone can be injection molded in a simple and economic manner, so that there are scarcely any limits to the shapes into which it can be formed.

Further refinements are specified in the dependent claims.

Polyetherimides are plastics known as such which were developed specially for high temperature materials. Polyetherimides are described, for example, in German Patent No. 24 16 595 and in German Published Application No. 27 16 444. A polyetherimide suitable for injection molding is described in German Published Application No. 30 16 691.

A preferred polyetherimide is constructed of the following repeating units:

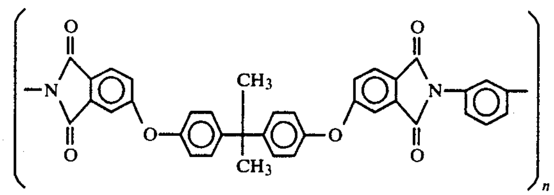

This polyetherimide heavily yellowish, amber-colored, transparent, thermoplastic artificial material which will preferably display the following properties:

A tensile strength, measured according to DIN 53455, of 90 to 140N/m$^2$; a stretching to the breaking point, measured according to DIN 53455, of 40 to 80%; a bending modulus, measured according to DIN 53457, of 2500 of 5000N/mm$^2$; an IZOD notch impact strength, measured according to ASTM D 2566 of 30 to 90 J/m; a vitreous temperature of 210° to 230° C.; a thermal mold stability of shape DTUL, measured at 1.82N/mm$^2$ according to ASTM D 648, of 190° to 210° C.; and a density, measured according to DIN 53479, of 1.10 to 1.50 Mg/m$^3$.

One especially favorable material is a poletherimide with the following properties:

A tensile strength, measured according to DIN 53455, of 100 to 110N/mm$^2$; a stretching to the breaking point, measured according to DIN 53455, of 55 to 65%; a bending modulus, measured according to DIN 53457, of 3000 to 3500N/mm$^3$; an IZOD notch impact strength, measured according to ASTM D 256, of 40 to 60 J/m; a vitreous temperature of 215° to 220° C., a thermal mold stability of shape DTUL, measured according to ASTM D 648, of 195° to 205° C.; and a density, measured according to DIN 53479, of 1.25 to 1.30 Mg/m$^3$.

Suitable polyetherimide materials are described in the company brochure "Ultem", published by General Electric Plastics Europe. One especially favored material is the unreinforced polyetherimide commercially available is known as "Ultem 1000", which is supplied by General Electric. However, the reinforced types can also be applied.

Polyethersulfones are also plastics known as such, and are described in, for instance, GB-PSs Nos. 10 78 234 and 11 53 035. One polyethersulfone suited within the scope of this invention shows the following repeating units:

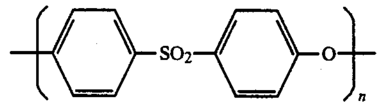

This polyethersulfone illustrated above is a heavily yellowish, transparent, thermoplastic material which will preferably exhibit the following properties:

a tensile strength at 20° C., measured according to DIN 53455, of 60 to 140N/mm$^2$; a stretching to the breaking point, measured according to ASTM D 638, of 30 to 90%; a bending modulus at 20° C., measured according to ASTM D 790, of 2000 to 6000N/mm$^2$, an IZOD notch impact strength, measured according to ASTM D 256 (6.4-mm testing body notched), of 60 to 100 J/m; a softening point according to Vicat, measured according to ASTM D 1525, of 210° to 230° C.; a thermal mold stability of shape DTUL, measured according to ASTM D 648, of 190° to 210° C.; and a density, measured according to ASTM D 792, of 1.20 to 1.50 $Mg/m^3$.

One especially preferable material is a polyethersulfone with the followig properties:

a tensile strength at 20° C., measured according to DIN 53455, of 70 to $110N/mm^2$; a stretching to the breaking point, measured according to ASTM D 638, of 40 to 80%; a bending modulus at 20° C., measured according to ASTM D 790, of 2000 to $3000N/mm^2$; an IZOD notch impact strength, measured according to ASTM D 256 (6.4-mm testing body notched), of 70 to 90 J/m; a softening point according to Vicat, measured according to ASTM D 1525, of 220° to 230°; a thermal mold stability of shape DTUL, measured according to ASTM D 648, of 200° to 210° C.; and a density, measured according to ASTM D 792, of 1.30 to 1.40 $Mg/m^3$.

Suitable polyethersulfone materials are described in the company brochure "Victrex", Polyethersulfone, the High Temperature Resistant Technical Thermoplast, published by Imperial Chemical Industries, Ltd., 1979. One especially preferred material is the polyethersulfone available commercially called Victrex 200 P and 300 P, representing the unreinforced types. However, reinforced types can also be applied.

Both types of plastics have an elastic resilience potential similar to that of elastic metals such as are employed in making spectacle frames. But polyetherimide is preferred to polyethersulfone since the elastic resilience potential of polyetherimide is even better.

Polyetherimide or polyethersulfone can be reinforced with glass or carbon fibers, but preferably they should not be reinforced. Reinforcing these plastics causes an increase in rigidity, but also a reduction in the desired elastic resilience potential.

Both types of plastics can contain additives, such as metal dust or color pigments, so that the spectacle frame or its components can be colored the shade desired. The surface of the two types of plastic can be pigmented or metalized. Metalizing can be accomplished by means of galvanizing, plating or metal evaporation.

Polyetherimide and polyethersulfone can easily be processed and especially injection molded. Polyetherimide can be injection molded at 350° to 450° C., especially at 380° to 420° C. The technology of injection molding is generally familiar to the specialist, so that nothing need be pointed out in this regard.

According to a preferred embodiment, the spectacle frames and their components will contain no supporting metal inserts whatsoever. Especially such strongly stressed parts as the temple will contain no core of metal.

In the following this invention is explained more closely by means of an example:

EXAMPLE

A spectacle temple was produced of polyetherimide (Ultem 1000, supplied by the firm of General Electric) by means of injection molding at 400° C. The wall thickness of the temple was of somewhat stronger dimensions than for those of a corresponding metal temple. The elastic resilience potential of the spectacle temple was tested by a continuous load test. For this purpose the temple was clamped firmly at the front end and the back end of the temple was deflected by 6 cm out of the horizontal and kept in this deflected position for certain time spans. After certain time spans the temple was allowed to spring back and the deviation from the horizontal was then measured, which represents a measure of the elastic resilient potential of the temple. It was found that a spectacle temple made of polyetherimide after several weeks of being distended returned to its original condition, so that no loss of its springing capacity had set in. A temple made of polyethersulfone (Victrex 200 P and 300 P, supplied by ICI) showed similar results.

In addition, spectacle temples made of polyamide, polycarbonate, cellulose acetate, cellulose butyrate, epoxide resins and other high-quality plastics were examined. The other plastics tested in their entirety failed to show the elastic resilience potential of polyetherimide. After relatively short spans of time a permanent deformation of the spectacle temple was observed.

Spectacle frames and spectacle frame components made of plastic are described, whereby the plastic is a polyetherimide or a polyethersulfone.

What is claimed is:

1. Spectacle frame and parts thereof of plastic, wherein said spectacle frame and parts thereof are substantially comprised of a polyetherimide which exhibits the following repeating unit:

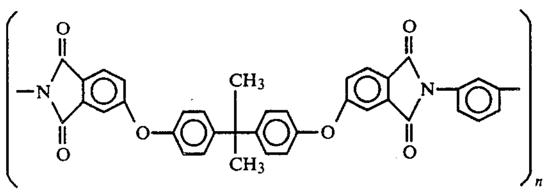

or is comprised of a polyethersulfone which exhibits the following repeating unit:

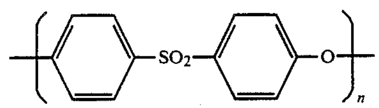

2. Spectacle frame and parts thereof according to claim 1, wherein said plastic is a polyetherimide having a vitreous temperature of 210° to 230° C.

3. Spectacle frame and parts thereof according to claim 1, wherein said plastic is a polyetherimide having a vitreous temperature of 215° to 220° C.

4. Spectacle frame and parts thereof according to claim 1, wherein said plastic is polyethersulfone and has a softening point according to Vicat, measured according to ASTM D 1525, of 210° to 230° C.

5. Spectacle frame and parts thereof according to claim 1, wherein said plastic is polyethersulfone and has a softening point according to Vicat, measured according to ASTM D 1525, of 220° to 230° C.

6. Spectacle frame and parts thereof according to claim 1, wherein said polyetherimide or polyethersulfone has an elastic resilience potential similar to that of spectacle frame metal.

7. Spectacle frame and parts thereof according to claim 1, wherein said polyetherimide or polyethersulfone is not reinforced.

8. Spectacle frame and parts thereof according to claim 1, wherein said polyetherimide or polyethersulfone is reinforced with glass or carbon fibers.

9. Spectacle frame and parts thereof according to claim 1, wherein said polyetherimide or polyethersulfone contains metal dust and/or color pigments.

10. Spectacle frame and parts thereof according to claim 1, wherein the surface of the polyetherimide or polyethersulfone is pigmented or metalized.

11. Spectacle frame and parts thereof according to claim 1, wherein the frame and its parts contain no supporting inserts.

12. Use of polyetherimide which exhibits the following repeating unit:

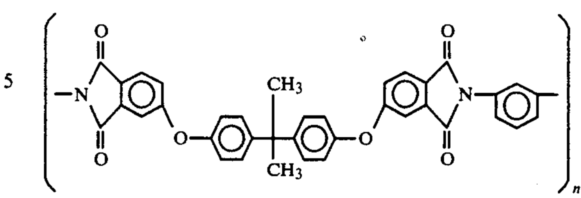

or polyethersulfone which exhibits the following repeating unit:

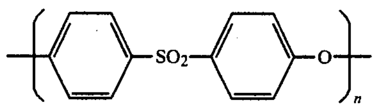

for the production of a spectacle frame and parts thereof, especially the temple, flange and bridges by injection molding.

* * * * *